(12) United States Patent
Dickey et al.

(10) Patent No.: US 8,645,252 B1
(45) Date of Patent: Feb. 4, 2014

(54) METHOD AND SYSTEM FOR PROVIDING MANDATORILY CONVERTIBLE SECURITIES WITH ASSOCIATED CALL OPTIONS

(71) Applicant: Citigroup Global Markets Inc., New York, NY (US)

(72) Inventors: John Dickey, New York, NY (US); Adam Dohrenwend, New York, NY (US); Peter Jurdjevic, New York, NY (US); Daniel Khouri, New York, NY (US); Stanley Louie, Brooklyn, NY (US); Vincent Vignale, New York, NY (US)

(73) Assignee: Citigroup Global Markets, Inc., New York, NY (US)

( * ) Notice: Subject to any disclaimer, the term of this patent is extended or adjusted under 35 U.S.C. 154(b) by 0 days.

(21) Appl. No.: 13/938,271

(22) Filed: Jul. 10, 2013

Related U.S. Application Data

(63) Continuation of application No. 12/357,936, filed on Jan. 22, 2009, now Pat. No. 8,504,453, and a continuation of application No. 10/445,802, filed on May 28, 2003, now abandoned.

(51) Int. Cl.
*G06Q 40/00* (2012.01)
(52) U.S. Cl.
USPC .......................................... 705/35; 705/36 R
(58) Field of Classification Search
USPC ..................................................... 705/35–40
See application file for complete search history.

(56) References Cited

U.S. PATENT DOCUMENTS

| | | | |
|---|---|---|---|
| 8,510,203 B2 * | 8/2013 | Corcoran et al. | 705/37 |
| 2003/0225656 A1 | 12/2003 | Aberman et al. | |
| 2004/0039669 A1 * | 2/2004 | Jones et al. | 705/35 |
| 2004/0133494 A1 | 7/2004 | Jones et al. | |

OTHER PUBLICATIONS

Bensman, Las Vegas Places a Hedged Bet Against Refinancing, Institutional Investor, ABI/INFORM Global, 1993, pp. 74-75, vol. 27, No. 1.
Gitman et al., Fundamentals of Investing, Harper & Row Publishers, Second Edition, 1984, pp. 398-399, 410-411.
Toal, Capital Clicks, Oil & Gas Investor, 1999, vol. 19, No. 11, downloaded from the internet on Dec. 10, 2004 from http://proquest.umi.com/pqdweb?RQT=309&VInst=PROD&VName=PQD&VType=PQD&sid=7&index=2&SrchMode=1&Fmt=3&did=000000046610359&clientId=19649, 15 pages.
What do our 30,000 users know that you don't?, MB Risk Management, 1988-2005, pp. 4-22.

* cited by examiner

*Primary Examiner* — Thu Thao Havan
(74) *Attorney, Agent, or Firm* — Eric L. Sophir; Dentons US LLP

(57) ABSTRACT

The present invention relates to a method and system for offering mandatorily convertible securities (e.g., DECS) with associated forward purchase contracts and call options. Each mandatorily convertible security combines a forward purchase contract, a mandatory portable remarketable security, and a call option to form a single investment unit. The call option provides additional capital to the issuer of the investment unit and profits to the remarketing agent handling the mandatory portable remarketable security.

20 Claims, 1 Drawing Sheet

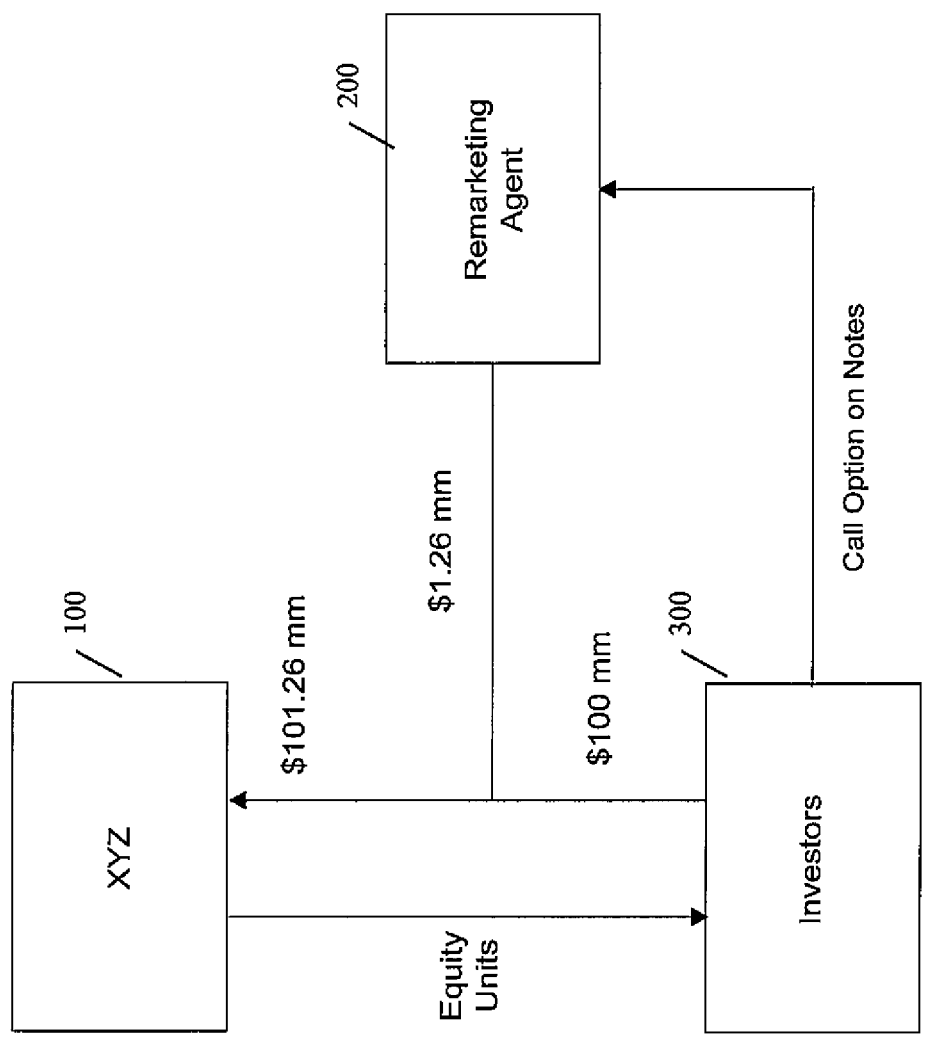

METHOD AND SYSTEM FOR PROVIDING MANDATORILY CONVERTIBLE SECURITIES WITH ASSOCIATED CALL OPTIONS

PRIORITY

This application claims priority to and is a continuation of co-pending U.S. patent application Ser. No. 12/357,936 entitled "METHOD AND SYSTEM FOR PROVIDING MANDATORILY CONVERTIBLE SECURITIES WITH ASSOCIATED CALL OPTIONS," filed Jan. 22, 2009, which is a continuation of U.S. patent application Ser. No. 10/445,802 entitled "METHOD AND SYSTEM FOR PROVIDING MANDATORILY CONVERTIBLE SECURITIES WITH ASSOCIATED CALL OPTIONS," filed May 28, 2003, which is herein incorporated by reference in its entirety.

BACKGROUND OF THE INVENTION

1. Field of the Invention

The present invention relates to the field of structured financial products. More particularly, the present invention relates to a method and system for offering mandatorily convertible securities, such as Dividend Enhanced Common Stock (DECS), with associated forward purchase contracts and call options.

2. Background

As known in the art, structured financial products are financial instruments that are designed and created by investment institutions for business entities (e.g., corporations) to issue and sell to investors for specific capital-raising activities. In turn, investors purchase structured financial products, focusing on payoff patterns (i.e., capital appreciation and/or current income) of the products, to address their specific investment objectives. As referred herein, an investor can be an individual, a group of individuals, an organization, or a business entity.

One of the many structured financial products in existence today is the conventional DECS. As understood in the art, a DECS is typically a preferred security, issued by a business entity paying a cash distribution, with a mandatory conversion into shares of common stock at a specified future time and based on a specified conversion price. DECS are typically structured to have a face amount equal to the price of the common stock at the time of issuance. The DECS conversion feature typically works as follows: 1) if the common stock price on the mandatory conversion date is at or below the common stock price on the issuance date, each DECS will convert into a fixed number of common stock equal to:

Face amount of DECS/Common Stock Price on Issuance Date;

2) if the common stock price on the mandatory conversion date is above the common stock price on the issuance date but below the conversion price, each DECS will convert into a variable number of common stock equal to:

Face amount of DECS/Common Stock Price on Mandatory Conversion Date, or 3) if the common stock price on the mandatory conversion date is at or above the conversion price, each DECS will convert into a fixed number of common stock equal to:

Face amount of DECS/Conversion Price.

A variation of the DECS is the Upper DECS, which differs from the DECS structure in that Upper DECS achieves the conversion-like feature by combining two securities into a single investment unit:

i. a fixed income instrument, such as a senior note or a trust preferred security, having a certain maturity date (e.g., a seven-year fixed income instrument) and a coupon (i.e., enhanced dividend); and ii. a forward purchase contract that obligates the investor to purchase a certain number of common-stock shares (e.g., a three-year purchase contract) based on a purchase schedule similar to the conversion schedule laid out above for the DECS product.

Hence, when an investor pays $100 to purchase an Upper DECS, the investor is purchasing two instruments: a $100 fixed income instrument and the forward purchase contract. The fixed income instrument is pledged as collateral for the investor's future obligation to purchase the common stock under the forward purchase contract. At year 3 the first investor is required to satisfy the contract by purchasing the contracted number of common stock shares. The obligation may be satisfied in one of two ways:

i. on or prior to the remarketing date, strip the fixed income instrument from the unit and deliver sufficient US government Treasuries to satisfy its obligation under the forward purchase contract; or ii. submit the fixed income instrument to the remarketing agent in year 3 for remarketing to a second investor. The proceeds from the remarketing will be used for the purpose of purchasing the common stock from the issuer by the first investor.

Because the fixed income instrument has a five-year maturity date, it will remain outstanding for another two years. At year 5 the issuer will redeem the fixed income instrument from the second investors (or those first investors who elected to strip the fixed income instrument from the unit) for $100.

SUMMARY OF THE INVENTION

A benefit of the Upper DECS over the conventional DECS is the ability of the issuer to receive a tax deduction for the amount paid out on the fixed income instrument coupon, i.e., the paid-out enhanced dividend. The Upper DECS issuer also receives proceeds from the issuance of such product and the subsequent remarketing.

The preferred embodiments of the present invention seek to modify the conventional Upper DECS structure by provide a system and method for offering a novel Upper DECS that combines a forward purchase contract with a mandatorily callable remarketable security that generates additional proceeds for the issuer through the monetization of the call option.

The preferred embodiments of the present invention also provide a system and method for offering a novel Upper DECS that combines a forward purchase contract with a fixed income instrument, wherein the novel Upper DECS is attractive to remarketing agents by providing them with the opportunity to obtain a call option on the fixed income instrument.

The preferred embodiments of the present invention further provide a system and method for offering a new type of Upper DECS to investors as another investment option, wherein the novel Upper DECS is a single investment unit comprising a forward purchase contract and a fixed income instrument in the form of a debt instrument (or other fixed income security with periodic payments and/or fixed redemption price) with a resetable coupon that may be called from the initial investors on the stock purchase date.

BRIEF DESCRIPTION OF THE DRAWINGS

The preferred embodiments of the present invention are illustrated by way of example and not limited to the following FIGURES and appendices, in which:

FIG. 1 depicts a structural overview of the novel Upper DECS in accordance with an embodiment of the present invention.

DETAILED DESCRIPTION OF THE INVENTION

Reference is now made in detail to the preferred embodiments of the present invention, illustrative examples of which are illustrated in the accompanying drawings, showing a method and system for a novel mandatorily convertible security that combines a forward purchase contract with a call option that generates additional capital for the issuer and trade opportunities for the remarketing agent.

FIG. 1 shows a structural overview of the novel Upper DECS of the present invention. According to the preferred embodiments of the present invention, each novel Upper DECS is a single equity unit comprising a forward purchase contract and mandatorily callable remarketable security in the form of a fixed income instrument. According to an embodiment of the present invention, the fixed income instrument can be a debt instrument. Although the fixed income instrument will be owned by the investor, it initially will be pledged to the issuer to secure the investor's monetary obligation under the forward purchase contract. The investor may elect at any time to withdraw the pledged fixed income instrument or, after the remarketing described below, Treasury securities underlying the novel Upper DECS unit, creating a "stripped unit." (i.e., wherein the fixed income instrument is no longer pledged for satisfaction of the forward purchase contract. An investor may wish to do so for additional fixed-income exposure prior to remarketing). To create a stripped unit, the investor must substitute, as pledged securities, specifically identified Treasury securities that will pay an agreed-upon price on the stock purchase date in satisfaction of the forward purchase contract. Thereafter, the pledged fixed income instrument or underlying Treasury securities will be released from the pledge agreement and delivered to the investor. The investor holding a stripped unit may recreate a novel Upper DECS of the present invention by re-substituting the fixed income instrument or, after the remarketing, applicable Treasury securities for the Treasury securities underlying the stripped unit.

Under the terms of the forward purchase contract, the investor who purchased the novel Upper DECS must purchase common stock from the issuer at a future stock purchase date (e.g., end of year 4) based on a purchase schedule similar to that of the conventional DECS and Upper DECS products. For instance, FIG. 1 shows investors 300 purchasing $100 million worth of the novel Upper DECS from the issuer, XYZ Company 100. As part of the novel Upper DECS of the present invention, the issuer and a participating remarketing agent will enter into a remarketing agreement whereby the latter will remarket the fixed income instrument on a specified remarketing date prior to the stock purchase date. FIG. 1 shows the remarketing agent 200, which can be any broker-dealer entity.

Thus, on the remarketing date (e.g., end of year 3.75), the remarketing agent will remarket the fixed income instrument to another investor. The proceeds from the aforementioned remarketing must be sufficient to satisfy the original investor's monetary obligation under the forward purchase contract. For instance, the remarketing proceeds can be used to acquire a Treasury portfolio sufficient to satisfy the purchase of the requisite common stock required under the forward purchase contract. The remarketing dealer can retain any excess funds after the purchase of the Treasury portfolio.

According to an embodiment of the present invention, the remarketing price of the fixed income instrument will be equal to the sum of 1) 100.50% of the Treasury portfolio value and 2) the fair value premium. The Treasury portfolio value will be equal to the sum of (i) the value at the remarketing date of such amount of Treasury securities that will pay, on or prior to the payment date falling on the stock purchase date, an amount of cash equal to the aggregate interest payments that, are scheduled to be payable on that quarterly payment date on the fixed income instrument which are included in the remarketing; and (ii) the value at the remarketing date of such amount of Treasury securities that will pay, on or prior to the stock purchase date, an amount of cash equal to a price set in the forward purchase contract for each fixed income instrument which is included in the remarketing. The remarketing agent will use the proceeds from the sale of the fixed income instrument to purchase the amount and the types of Treasury securities described in (i) and (ii).

The fair value premium will be equal to the greater of $0 or the difference between 1) the present value of a hypothetical Treasury note with a coupon equal to a specific rate and principal amount and maturity date equal to those of the fixed income instrument and 2) the principle amount of the fixed income instrument. The present value of the hypothetical Treasury note will be calculated by discounting the hypothetical Treasury note's scheduled cash flows to the remarketing date on a semi-annual basis at the then current yield of the then on-the-run Treasury note with a similar maturity date as the hypothetical Treasury note.

The yield of the fixed income instrument will be determined through a bidding process on the remarketing date. Other broker-dealers will be invited to bid for the fixed income instrument. The reset coupon will be computed based on the remarketing price and the lowest yield bid. The broker-dealer submitting the lowest yield bid will be obligated to purchase the fixed income instrument with a reset coupon at the remarketing price. The proceeds from the remarketing will be used to acquire the Treasury portfolio and the remarketing agent will retain the remaining proceeds, if any.

According to the preferred embodiments of the present invention, on the issue date of the novel Upper DECS the remarketing agent will obtain from the investor/holder an option to call the fixed income instrument on the remarketing date. The call option will give the remarketing agent the right, but not the obligation, to call the fixed income instrument from the investor on the remarketing date. The issuer charges a premium to make available the call option to the investor for sale to the remarketing agent. Thus, the remarketing agent will pay the premium, which will be forwarded to the issuer or a collateral agent on behalf of the investors, for the call option, together with the proceeds from the novel Upper DECS offering. For instance, FIG. 1 shows that the issuer receives a total of $101.26 million from the deal, the original $100 million from the investors and $1.26 million from the remarketing agent 200 on behalf of the investors for the call option. The remarketing agent can exercise the call option if the fair value premium, which is based on the then current level of the U.S. Treasure rate, is greater than 0. If the remarketing agent exercises the call option, it will be obligated to pay an amount equal to the Treasury portfolio value to the collateral agent for purchase of the Treasury portfolio. This will ensure the investor's ability to satisfy its monetary obligation under the forward purchase contract. Upon the exercise of the option and a successful remarketing, the proceeds from the remarketing

The invention claimed is:

1. A method for providing an investment unit comprising:
   providing, by a computer, from an issuer to a purchaser a fixed income instrument as a part of the investment unit;
   providing, by a computer, from the issuer to the purchaser a forward purchase contract as a part of the investment unit, wherein the forward purchase contract requires a purchase of at least one share of common stock at a specified price and at a stock purchase date;
   providing, by a computer, from the issuer to a remarketing agent a remarketing agreement as a part of the investment unit, wherein the remarketing agreement provides for a remarketing of the fixed income instrument on a remarketing date at a remarketing price computed, by a computer, equal to the sum of a percentage Treasury portfolio value, and the fair market premium; and
   providing, by a computer, from the issuer to the remarketing agent an option to call the fixed income instrument from the purchaser on the remarketing date, wherein the call option is a part of the investment unit.

2. The method of claim 1, wherein the remarketing agreement requires that the remarketing agent remarket the fixed income instrument held by the purchaser of the fixed income instrument.

3. The method of claim 2, wherein the step of providing the call option further comprises:
   requiring the remarketing agent to provide a monetary amount sufficient to cover the purchaser's purchase of the at least one share of common stock as required under the forward purchase contract.

4. The method of claim 1, wherein the step of providing the call option further comprises:
   requiring the remarketing agent to purchase the call option on behalf of the purchaser.

5. The method of claim 1, wherein the percentage of the Treasury portfolio value is 100.50%.

6. The method of claim 1, wherein the fixed income instrument is a fixed income security with periodic payments and fixed redemption price.

7. The method of claim 1, wherein the treasury portfolio value is equal to the sum of:
   (1) the value at the remarketing date of such an amount of Treasury securities that will pay, on or prior to the stock purchase date, an amount of cash equal to an aggregate of interest payments that are scheduled to be payable on a quarterly payment date on the fixed income instrument; and
   (2) the value at the remarketing date of such amount of Treasury securities that will pay, on or prior to the stock purchase date, an amount of cash equal to a price set in the forward purchase contract for each fixed income instrument.

8. The method of claim 1, wherein the fair market premium is equal to the greater of $0 or the difference between 1) the present value of a hypothetical Treasury note with a coupon equal to a specific rate and principal amount and maturity date equal to those of the fixed income instrument, and 2) a principal amount of the fixed income instrument.

9. The method of claim 1, wherein the remarketing price has a yield computed by a computer through a bidding process on the remarketing date.

10. The method of claim 9, wherein a reset coupon is computed by a computer based on the remarketing price and a lowest yield bid.

11. A method for providing an investment unit comprising:
    providing, by a computer, from an issuer to a purchaser a fixed income instrument as a part of the investment unit;
    providing, by a computer, from the issuer to the purchaser a forward purchase contract as a part of the investment unit, wherein the forward purchase contract requires a purchase of at least one share of common stock at a specified price and at a stock purchase date;
    providing, by a computer, from the issuer to a remarketing agent a remarketing agreement as a part of the investment unit, wherein the remarketing agreement provides for a remarketing of the fixed income instrument on a remarketing date at a remarketing price with a yield computed, by a computer, based on predetermined market variables; and
    providing, by a computer, from the issuer to the remarketing agent an option to call the fixed income instrument from the purchaser on the remarketing date, wherein the issuer charges a premium to make available the call option to the investor for sale to the remarketing agent, and the remarketing agent pays the premium to the issuer.

12. The method of claim 11, wherein the remarketing price is computed by a computer, and the remarketing price is equal to the sum of 1) 100.50% of a Treasury portfolio value, and 2) the fair market premium.

13. The method of claim 12, wherein the treasury portfolio value is equal to the sum of:
    (1) the value at the remarketing date of such an amount of Treasury securities that will pay, on or prior to the stock purchase date, an amount of cash equal to an aggregate of interest payments that are scheduled to be payable on a quarterly payment date on the fixed income instrument; and
    (2) the value at the remarketing date of such amount of Treasury securities that will pay, on or prior to the stock purchase date, an amount of cash equal to a price set in the forward purchase contract for each fixed income instrument.

14. The method of claim 12, wherein the fair market premium is equal to the greater of $0 or the difference between 1) the present value of a hypothetical Treasury note with a coupon equal to a specific rate and principal amount and maturity date equal to those of the fixed income instrument, and 2) a principal amount of the fixed income instrument.

15. The method of claim 12, wherein the remarketing price has a yield computed by a computer through a bidding process on the remarketing date.

16. The method of claim 15, wherein a reset coupon is computed by a computer based on the remarketing price and a lowest yield bid.

17. The method of claim 12, wherein the remarketing agent can exercise the call option if the fair market premium that is based on a current level of the U.S. Treasury rate is greater than 0.

18. The method of claim 12, wherein the remarketing agent pays an amount equal to the Treasury portfolio's value to the issuer for purchase of the Treasury portfolio when the remarketing agent exercises the call option.

19. The method of claim 11, wherein the fixed income instrument is a fixed income security with periodic payments and fixed redemption price.

20. The method of claim 11, wherein the remarketing date is prior to the stock purchase date under the forward purchase contract.

* * * * *